US011588230B2

(12) United States Patent
Ruppel et al.

(10) Patent No.: US 11,588,230 B2
(45) Date of Patent: Feb. 21, 2023

(54) SYSTEM FOR TRANSMITTING RADIO FREQUENCY SIGNALS FROM A VEHICLE

(71) Applicant: Aptiv Technologies Limited, St. Michael (BB)

(72) Inventors: Christopher David Ruppel, Carmel, IN (US); Grzegorz Wyszynski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 273 days.

(21) Appl. No.: 17/096,665

(22) Filed: Nov. 12, 2020

(65) Prior Publication Data

US 2022/0149511 A1 May 12, 2022

(51) Int. Cl.
*H01Q 1/32* (2006.01)
*H01Q 1/38* (2006.01)
*B60R 25/24* (2013.01)

(52) U.S. Cl.
CPC ......... *H01Q 1/3266* (2013.01); *B60R 25/245* (2013.01); *H01Q 1/3233* (2013.01); *H01Q 1/38* (2013.01); *B60R 2325/101* (2013.01); *B60R 2325/105* (2013.01)

(58) Field of Classification Search
CPC ........ B60R 2325/101; B60R 2325/105; B60R 25/245; H01Q 1/3233; H01Q 1/3266; H01Q 1/38
See application file for complete search history.

(56) References Cited

U.S. PATENT DOCUMENTS

| 5,268,795 A | 12/1993 | Usami | |
| 6,259,412 B1 * | 7/2001 | Duroux | ..................... B60R 1/12 343/711 |
| 6,547,133 B1 * | 4/2003 | DeVries, Jr. | ......... G06Q 20/341 235/382.5 |

(Continued)

FOREIGN PATENT DOCUMENTS

DE 102012008914 11/2013
DE 102014220713 4/2016

OTHER PUBLICATIONS

"Extended European Search Report", EP Application No. 20157054.6, dated Aug. 28, 2020, 8 pages.

(Continued)

*Primary Examiner* — Nader Bolourchi
(74) *Attorney, Agent, or Firm* — Sawtooth Patent Group PLLC (57) ABSTRACT

The techniques of this disclosure relate to a system for transmitting radio frequency signals. The system includes a controller in communication with a first device fixed within a first housing attached to an exterior of a vehicle. The system also includes a second device fixed within a second housing attached to the exterior of the vehicle. The controller determines whether the first housing and the second housing are in a first position or in a second position. When the first housing and the second housing are in the first position, the controller transmits first radio frequency signals via the first device and via the second device. When the first housing and the second housing are in the second position, the controller transmits second radio frequency signals via the first device and via the second device. The system improves an antenna coverage area of the first device and second device.

20 Claims, 5 Drawing Sheets

(56) References Cited

U.S. PATENT DOCUMENTS

| | | | |
|---|---|---|---|
| 7,231,177 B2 | 6/2007 | Walker et al. | |
| 7,772,966 B2 | 8/2010 | Turnbull et al. | |
| 8,576,138 B2 * | 11/2013 | Suzuki | H01Q 1/3266 343/872 |
| 8,614,645 B2 | 12/2013 | Chakam et al. | |
| 9,201,627 B2 | 12/2015 | Tam et al. | |
| 9,875,591 B2 | 1/2018 | Watters et al. | |
| 10,085,072 B2 | 9/2018 | Shimy et al. | |
| 10,149,133 B2 | 12/2018 | Seagnol et al. | |
| 10,564,261 B2 | 2/2020 | Huebner et al. | |
| 10,793,109 B2 | 10/2020 | Salah et al. | |
| 10,839,627 B2 | 11/2020 | Golsch et al. | |
| 2002/0003481 A1 | 1/2002 | Kantola et al. | |
| 2005/0258936 A1 | 11/2005 | Ghabra et al. | |
| 2006/0022881 A1 * | 2/2006 | Yegin | B60R 1/12 343/711 |
| 2007/0268110 A1 * | 11/2007 | Little | B60R 25/24 340/5.1 |
| 2010/0317289 A1 | 12/2010 | Desai et al. | |
| 2014/0240091 A1 | 8/2014 | Talty et al. | |
| 2014/0357194 A1 | 12/2014 | Jin et al. | |
| 2015/0048927 A1 | 2/2015 | Simmons | |
| 2015/0134949 A1 | 5/2015 | Baldwin | |
| 2016/0050219 A1 | 2/2016 | Niewczas et al. | |
| 2016/0050564 A1 | 2/2016 | Niewczas et al. | |
| 2017/0093727 A1 | 3/2017 | Chen et al. | |
| 2017/0111763 A1 | 4/2017 | Morgan et al. | |
| 2019/0069243 A1 | 2/2019 | Bean et al. | |
| 2019/0297628 A1 | 9/2019 | Kato et al. | |
| 2020/0314619 A1 | 10/2020 | Ruppel et al. | |
| 2021/0284098 A1 | 9/2021 | Scott et al. | |

OTHER PUBLICATIONS

"Non-Final Office Action", U.S. Appl. No. 16/370,064, dated Dec. 30, 2020, 6 pages.

* cited by examiner

SYSTEM FOR TRANSMITTING RADIO FREQUENCY SIGNALS FROM A VEHICLE

BACKGROUND

Antennas used for remote keyless-entry (RKE) and passive-entry passive-start (PEPS) vehicle systems are positioned on the vehicle for detecting an approaching vehicle operator in possession of a paired key fob. These antennas benefit from vehicle locations that are not blocked by metals or other vehicle components that may obstruct radio frequency (RF) transmissions. Placing these antennas at corners of the vehicle behind plastic trim components, for example, behind a bumper facia, results in relatively low installation heights that may inhibit accurate range detection. Additionally, these corner mounting locations often do not directly face the approaching vehicle operator and typically locate other sensors that compete for available packaging space. Some RKE and PEPS systems are transitioning from wireless RF protocols to newer Bluetooth Low Energy (BLE) and Ultra-Wide Band (UWB) technologies for improved distance-measuring capabilities. Systems using BLE and UWB present packaging challenges for antenna and/or communication node placements because the antennas cannot be concealed behind metal structures due to the relatively high RF transmission frequencies.

SUMMARY

This document describes one or more aspects of a system for transmitting radio frequency signals from a vehicle. In one example, a system includes a controller in communication with a first device fixed within a first housing attached to, or that forms part of, an exterior portion of a vehicle. The controller is also in communication with a second device fixed within a second housing attached to, or that forms part of, the exterior portion of the vehicle. The controller is configured to determine whether the first housing and the second housing are in a retracted position or in an unretracted position. When the first housing and the second housing are in the retracted position, the controller is configured to transmit first radio frequency (RF) signals via the first device and via the second device.

In another example, a system includes a controller in communication with a first device fixed within a first side-mirror attached to, or that forms part of, an exterior portion of a vehicle. The controller is also in communication with a second device fixed within a second side-mirror attached to, or that forms part of, the exterior portion of the vehicle. The controller is configured to determine whether the first housing and the second housing are in a retracted position or in an unretracted position. When the first side-mirror and the second side-mirror are in the retracted position, the controller is configured to transmit first radio frequency (RF) signals via the first and second devices. When the first side-mirror and the second side-mirror are in the unretracted position, the controller is configured to transmit second RF signals via the first and second devices.

In another example, a method includes determining, with a controller in communication with a first device fixed within a first housing attached to, or that forms part of, an exterior portion of a vehicle, and a second device fixed within a second housing attached to, or that forms part of, the exterior portion of the vehicle, whether the first housing and the second housing are in a retracted position or in an unretracted position. The method also includes transmitting, with the controller, first radio frequency (RF) signals via the first and second devices when the first and second housing are in the retracted position.

This summary is provided to introduce aspects of a system for transmitting radio frequency signals from a vehicle, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where cameras can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a system for transmitting radio frequency signals from a vehicle are described in this document with reference to the following drawings. The same numbers are used throughout the drawings to reference like features and components.

DETAILED DESCRIPTION

Overview

The techniques of this disclosure relate to a system for transmitting radio frequency signals from a vehicle. Prominent side-mirror locations on a vehicle are beneficial for remote keyless-entry (RKE) and/or passive-entry passive-start (PEPS) communication node and antenna locations. The use of power-folding side-mirror housings enables aiming a bore sight of an antenna in different directions for increased antenna pattern coverage. For RKE and PEPS applications related to a parked or locked vehicle, side-mirror housings placed in a retracted or "folded-in" position can enable antennas mounted inside the side-mirror housings to have a broader antenna coverage pattern at sides of the vehicle. For example, a key fob in possession of a user that is approaching the retracted mirror housings may communicate more accurately or more reliably than if the mirror housings are unretracted or "folded-out". Placement of the antennas at door-entry points of the vehicle may be particularly desirable for determining a direction and distance of the key fob or other mobile transceiver that is paired with the RKE or PEPS system. In the retracted positions, the reflective metalized surfaces of the mirrors do not present signal-blocking issues as the user approaches the vehicle from the sides, compared to when the side-mirror housings are in an unretracted or "folded-out" position. For facilitating wireless communications between onboard vehicle components, such as part of vehicle diagnostic and functional safety self-test practices, locating the antennas in the folding side-mirror housings may be beneficial, particularly for communicating with other vehicle-mounted antennas and communication nodes, where a more direct line-of-sight may be achieved. For example, a component in a bumper housing may have improved wireless communications with a component in a mirror housing when the mirror housing is unretracted or folded-out, as compared to when the mirror is retracted or folded-in.

This disclosure introduces a system for transmitting radio frequency signals from a vehicle. Described is an RKE and PEPS system that locates communication nodes inside folding side-mirror housings that improves a coverage of a radiation pattern of the antennas.

Example System

Figure 1:
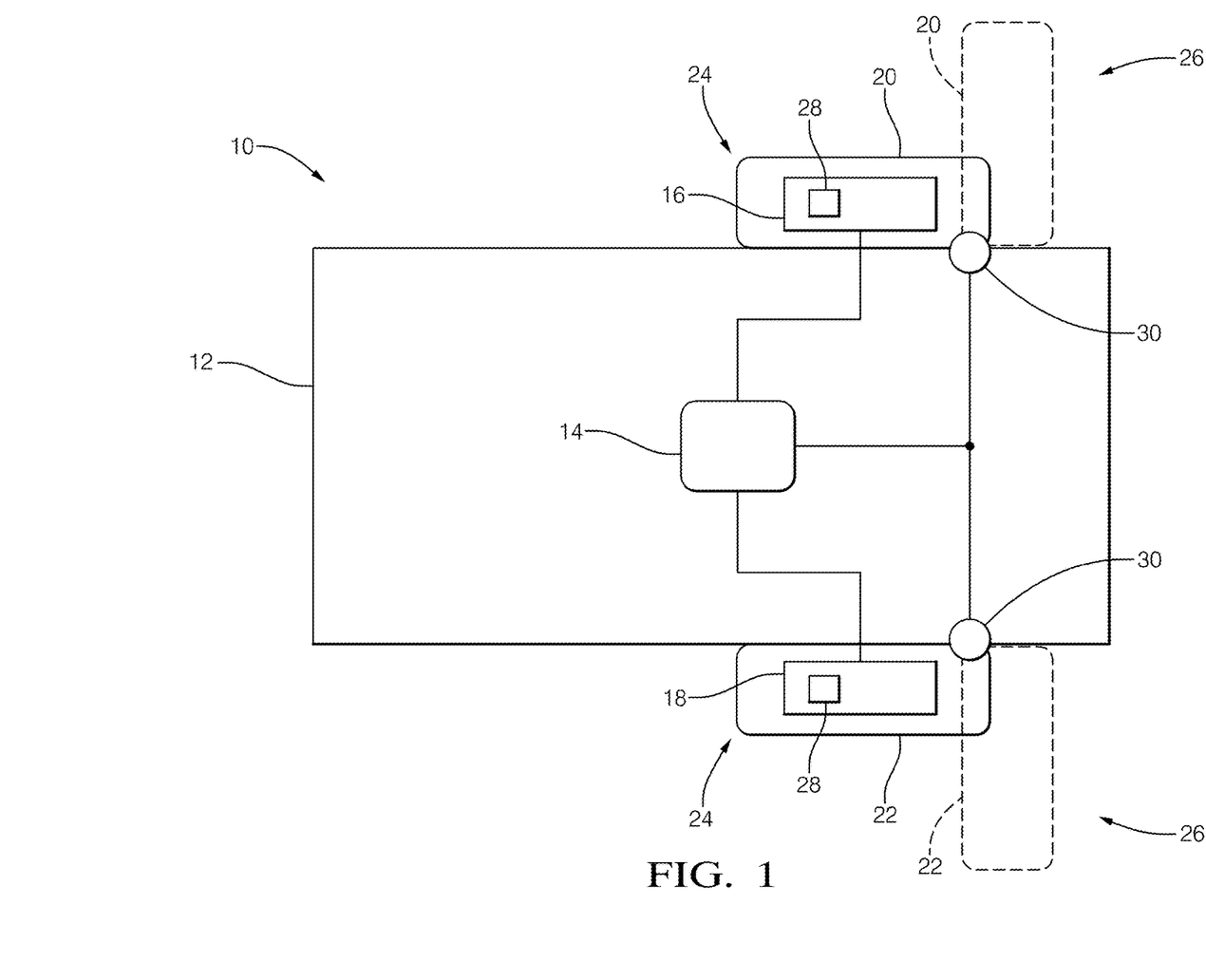
FIG. 1 illustrates an example system for transmitting radio frequency signals from a vehicle.

FIG. 1 illustrates an example of a system 10 for transmitting radio frequency signals from a vehicle 12. The system 10 includes a controller 14 in communication with a first device 16 and a second device 18 that are respectively fixed within a first housing 20 and a second housing 22, as will be described in more detail below. In this example, the first device 16 and the second device 18 each comprise a communication node 28 (see FIG. 2), and each communication node 28 includes one or more of a transceiver, an antenna, and a communication network channel. In the example illustrated in FIG. 2, the communication channel is a controller area network (CAN) channel. In some examples, the communication channel can be a local interconnect network (LIN) channel. In other examples, the communication channel can be an ethernet channel. In yet other examples, the communication channel can be a wireless channel, for example using BLUETOOTH® and Wi-Fi technologies. The vehicle 12 may include additional communication nodes 28 distributed around the exterior of the vehicle 12 that may be components of RKE and/or PEPS systems that are located, for example, at four corners of the vehicle 12 as illustrated in FIG. 3. The first device 16 and the second device 18 are configured to emit and receive radio frequency (RF) signals via the antennas of the communication nodes 28, as will be described in more detail below.

RF signals are wireless electromagnetic signals or radio waves having frequencies in a range from about 3 hertz (Hz) to 300 gigahertz (GHz). In some examples, RF signals are generated from natural sources, for example solar flares or lightning, and may be considered sources of electromagnetic noise. In other examples, the RF signals may be generated for communication purposes, for example, in television and radio broadcasting, radar systems, global navigation satellite systems (GNSS), mobile computing devices, remote controller devices, tracking devices, and cellular telephone networks. To reduce interference within the radio frequency spectrum, similar services operate in similar frequency bands or contiguous frequency sections. For example, Global Positioning System (GPS) is a GNSS that operates in two frequency bands of 1.2 GHz and 1.5 GHz. BLUETOOTH® and Wi-Fi are two prominent wireless standards having RF signals that operate in a frequency band of 2.4 GHz yet utilize different sections of the frequency band to reduce interference. For example, the BLUETOOTH® protocol divides the frequency band into 80 channels, each 1 MHz wide, and changes channels up to 1600 times per second. The BLUETOOTH® Low Energy protocol divides the frequency band into 40 channels, each 2 MHz wide. Some BLUETOOTH® versions include Adaptive Frequency Hopping which attempts to detect existing signals, for example Wi-Fi channels, and avoid them by negotiating a channel map between the communicating BLUETOOTH® devices. Ultra-Wide Band (UWB) is a wireless protocol that operates in the 3 GHz to 10.6 GHz range and pulses the transmissions of RF signals about every two nanoseconds. The UWB transmissions do not interfere with conventional narrowband and carrier wave transmissions in the same frequency band. RF signals using a same protocol or standard, for example the BLUETOOTH® standard, may differ based on their application or purpose. In some examples, BLUETOOTH® RF signals may include information unique to the RKE system. In other examples, BLUETOOTH® RF signals may be communications between other vehicle systems that are different from the RKE system.

Figure 2:
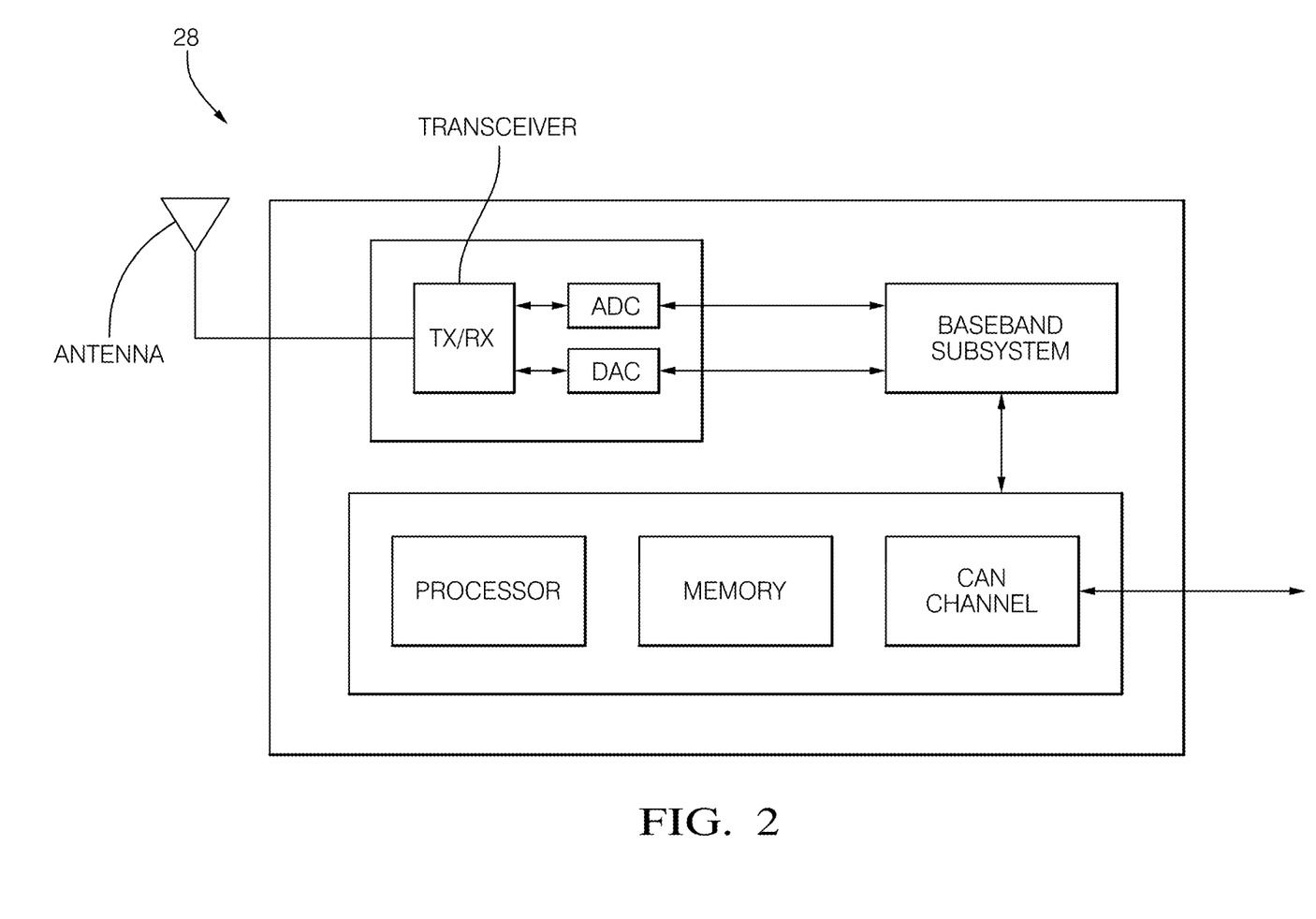
FIG. 2 illustrates an example communication node of the example system for transmitting radio frequency signals from a vehicle.
Figure 3:
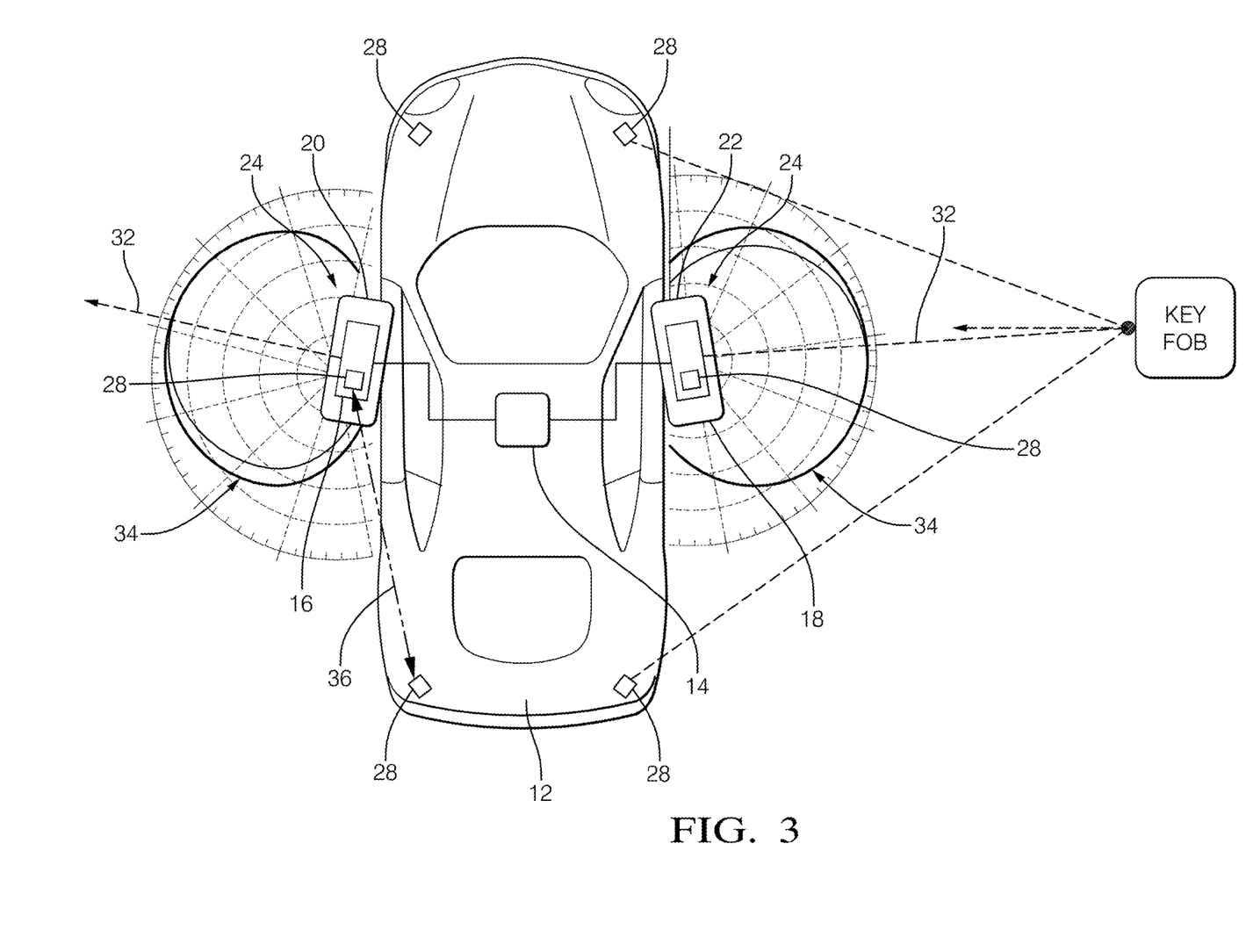
FIG. 3 illustrates an example of the example system for transmitting radio frequency signals from a device installed on the vehicle.

The communication node 28 illustrated in FIG. 2 may be any communication node 28 suitable for automotive applications. In the example illustrated in FIG. 2, the communication node 28 includes an RF subsystem including a transceiver, an analog to digital converter (ADC), and a digital to analog converter (DAC). The ADC is configured to convert the analog RF signals received via the antenna to digital signals for processing by a baseband subsystem, and the DAC is configured to convert digital signals received from the baseband subsystem to analog RF signals for broadcasting via the antenna. The communication node 28 may include a processor and memory, as well as the communication network channel (e.g., the CAN channel) to communicate with other vehicle systems.

Referring back to FIG. 1, the controller 14 is configured to determine whether the first housing 20 and the second housing 22 are in a first position 24 or in a second position 26. In some examples, the controller 14 determines the positions based on signals received from actuators 30 via a communication network bus (e.g., a CAN bus) that may be included as a component of the vehicle's 12 electrical wiring system. In other examples, the first housing 20 and second housing 22 include position sensors (not shown) that detect the positions of the first housing 20 and the second housing. The position sensors may transmit position data to the controller 14 via CAN messages over the CAN bus. In some examples, the actuators 30 are configured to move or rotate the first housing 20 and the second housing 22 between the first position 24 and the second position 26 based on CAN messages received from the controller 14. In other examples, the actuators 30 are configured to move or rotate the first housing 20 and the second housing 22 based on CAN messages received from another controller installed on the vehicle 12 that is in communication with the CAN bus.

The controller 14 may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller 14 may also combine custom hard-wired logic, ASICs, or FPGAs with custom programming to perform the techniques. The controller 14 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller 14 may include other examples of non-volatile memory, such as flash memory, read-only memory (ROM), programmable read-only memory (PROM), and erasable programmable read-only memory (EPROM). The controller 14 may include volatile memory (e.g., dynamic random-access memory (DRAM), static random-access memory (SRAM)). The one or more routines may be executed by the processor to perform steps for transmitting radio frequency signals from the vehicle based on signals received by the first device 16 and/or the second device 18 from the controller 14 as described herein.

FIG. 3 illustrates the vehicle 12 with the first housing 20 and second housing 22 in the first position 24. In this example, the first device 16 is fixed within the first housing 20 that is attached to, or that forms part of, an exterior portion of the vehicle 12, for example, a side-mirror housing. The second device 18 is fixed within the second housing 22 attached to, or that forms part of, the exterior portion of the vehicle 12, for example, an opposing side-mirror housing. That is, the first housing 20 is a left side-mirror housing, and the second housing 22 is a right side-mirror housing. Both of the housings 20 and 22 are mounted on opposite sides of the vehicle 12. In this example, the first position 24 is a retracted or "folded-in" position, where the mirrors are swept back, thereby reducing a width of the vehicle 12. The retracted position may be beneficial for parking the vehicle 12 in relatively narrow parking spaces or for reducing potential damage to the mirrors from other vehicles or moving objects. In some examples, the vehicle 12 automatically places the opposing side-mirror housings into the retracted positions when the vehicle is parked and powered off. In other examples, the opposing side-mirror housings may be retracted by the operator via a switch that activates the actuator 30 or by the operator manually moving the opposing side-mirror housings. In some examples, the controller 14 determines whether to move the first housing 20 and the second housing 22 to the first position 24 or to the second position 26 based on an anticipated direction of approach of the user, for example, when the vehicle 12 is parked in a parking garage where barriers may restrict an approach path of the user. In some examples, the opposing side-mirror housings are mounted to a driver's door and a passenger's door. In other examples, the opposing side-mirror housings are mounted to front fenders or other body panels of the vehicle 12 in a field of view of the operator.

Referring again to FIG. 3, when the first housing 20 and the second housing 22 are in the first position 24, the controller 14 is configured to transmit first RF signals 32 via the first device 16 and via the second device 18. In some examples, the first RF signals 32 comprise one of key FOB identification communications and key FOB localization communications (hereafter referred to as key FOB communications) originating from one of the RKE system, the PEPS system, and a Digital Key system. The controller 14 may be capable of transmitting both digital-wave and continuous-wave (i.e., analog) electromagnetic signals from the first device 16 and the second device 18. In some examples, the controller 14 may be programmed to transmit a localization protocol, for example, a digital message, including a preamble, a universal wake-up identification, and a data field that designates the message is an RKE, PEPS, or Digital Key system broadcast. In some examples, the digital message may be followed by a continuous-wave broadcast wherein a portion of the broadcast represents Received Signal Strength Indicator values (RSSI values) of the RF signals detected by the key fob or mobile transceiver. The RS SI values are a measurement of the power present in the received RF signal.

Larger RSSI values indicate stronger received RF signals and are inversely related to a distance between the signal source, for example, between the broadcasting antenna and the key fob. That is, the stronger the detected radio signal, the shorter the distance between the broadcasting antenna and the key fob.

In some examples, the controller 14 is configured to transmit the key FOB communications that are relatively low-frequency electromagnetic signals in a frequency band of about 125 kilohertz (kHz), for example, 100 kHz-150 kHz. In some examples, the controller 14 is configured to transmit electromagnetic signals in a frequency band of about 315 megahertz (MHz), for example, 260 MHz-470 MHz. Transmission of these relatively low-frequency electromagnetic signals may be advantageous because the low-frequency electromagnetic signals in the above-mentioned low-frequency band are able to pass through a human body with little to no distortion or attenuation.

In some examples, the controller 14 is configured to transmit the key FOB communications that are relatively high-frequency electromagnetic signals in accordance, or that comply with, a BLUETOOTH® Core Specification version 4.2 and later, including BLUETOOTH® Low Energy (hereafter BLE). The BLE RF signals are transmitted in a 2.4 GHz frequency band, for example, 2.400 GHz-2.4835 GHz, and have a maximum theoretical unobstructed range exceeding 600 meters (600 m). In some examples, BLE is employed in mobile phones, gaming systems, headsets, automotive infotainment systems, and personal computers. BLE devices may be detected through a procedure based on broadcasting advertising packets from a host device (e.g., the controller 14) and receiving scan-request packets from a remote BLE device, for example, the key fob or mobile transceiver (e.g., a smartphone or tablet). This may be done using at least three separate frequencies within the frequency band to reduce interference. The BLE advertising device sends a packet of information on at least one of the at least three frequencies, with a repetition period called an advertising interval. A BLE scanner in the host device listens to the frequency for a duration called a scan window when the scan request packets are received, which is periodically repeated every scan interval. BLE devices may be paired by sharing a code unique to each BLE device, called a link key. The link keys are exchanged between the pairing devices and stored in the pairing devices to establish a secure connection, also referred to as a bond. The unconnected and/or unpaired devices may share a limited amount of information without pairing, such as a device name, a device class, a list of services provided by the device, and other technical information specific to the device (e.g., device services, manufacturer, BLE specification, and clock offset). The controller 14 may be further configured to output the key FOB communications at a first transmission level corresponding to a first transmission range. In some examples, the first transmission level is a full-power level, for example, 0.5 mW to 10 mW, that corresponds to the maximum range of transmission that may exceed 600 m.

In other examples, the controller 14 is configured to transmit high frequency key FOB communications in accordance with, or that comply with, an Ultra-wideband (UWB) technology. UWB technology transmits information spread over a large signal bandwidth greater than 500 MHz at varying pulse repetition rates. An aspect of UWB technology is the ability of a UWB radio system to more accurately determine the "time of flight" of the transmission at various frequencies to determine localization measurements. The broad range of UWB RF frequencies (e.g., frequency bands in the 3 GHz to 10.6 GHz range) is also helpful to provide signal-propagation paths that include paths relatively free of multipath distortions.

Referring again to FIG. 3, the side-mirror housings placed in the retracted position enable aiming the bore sights of the antennas of the first device 16 and the second device 18 in directions that expand antenna coverage patterns 34 toward the rear of the vehicle 12. That is, the antennas are better able to transmit the key FOB communications in directions more normal to the sides of the vehicle 12, and, in turn, receive RF signals from other devices that may be located at right angles to the sides of the vehicle 12, or located aft of the side-mirror housings. The antenna coverage pattern 34, sometimes referred to as a radiation pattern, may vary in geometry based on a design of the antennas and do not only comprise the generally circular patterns as illustrated in FIG. 3. In some examples, the antenna coverage patterns 34 may include main lobes surrounded by side lobes. In some examples, the antennas are micro-strip antennas; in other examples, the antennas are metal plate antennas. In yet other examples, the antennas are chip antennas. It will be understood that the antenna-coverage pattern 34 is a function of the type of antenna used in the communication node 28.

Referring back to FIG. 3, the user holding the paired key fob and approaching from a right side of the vehicle 12 may be more readily detected when the side-mirror housings are in the retracted position. In addition, more accurate and timely localizations, or determinations of positions and/or distances of the key fob relative to the vehicle 12, may be enabled when using triangulation techniques via the second device 18 and the two other communication nodes 28 located at a front-right corner and at a rear-right corner of the vehicle 12. In this example, the second device 18 fixed inside the right side-mirror housing may have improved ranging accuracy when using BLE and/or UWB technologies due to the height of the right side-mirror housing above the ground, relative to the other communication nodes 28 installed on the vehicle 12. The side mirrors are typically installed higher above the ground compared to the other communication nodes 28 that are typically installed behind the bumper facias. This increased height results in the distance-measurement signals being dominated by line-of-sight paths, as opposed to reflected signal paths where the signal bounces off the ground and is measured as an increased distance, as illustrated in FIG. 4.

Figure 4:
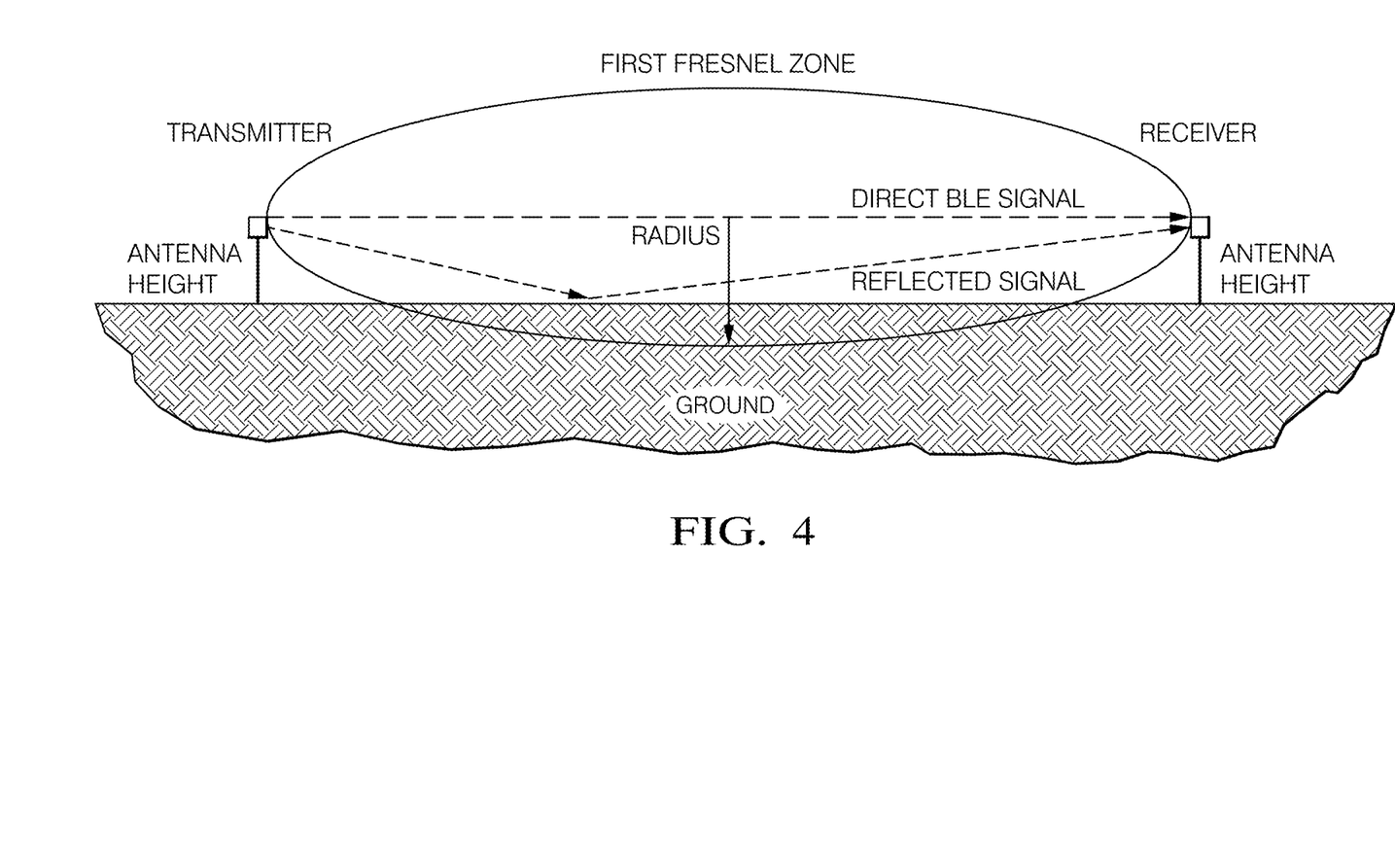
FIG. 4 illustrates an example of a first Fresnel zone of the example system for transmitting radio frequency signals from a vehicle.

FIG. 4 illustrates an example of a primary or first Fresnel zone, which defines the area around a visual line-of-sight into which the RF signals diffuse or spread. To ensure the highest performance of a wireless link, the first Fresnel zone is recommended to be at least 80% clear of obstructions, which includes the ground. In an example, a radius of the largest area of the first Fresnel zone may be determined based on the distance between the antennas and the transmission frequency using the equation, $$r = 17.32 \times \sqrt{d/4f}$$

where r is the radius, d is the distance between antennas in kilometers, and f is the transmission frequency in GHz. In an example, for a key fob located 10 m from the vehicle and a BLE signal transmission of 2.4 GHz, the radius of the first Fresnel zone is approximately 1.1 m. Furthermore, increasing the distances between the two antennas in FIG. 4 can also increase the radius of the first Fresnel zone, enveloping more potential obstructions. As such, mounting the first device 16 and the second device 18 higher on the vehicle 12, such as in the side-mirror housings, reduces multipath reflected signals, as well as the amount of obstructed signal caused by the ground.

Figure 5:
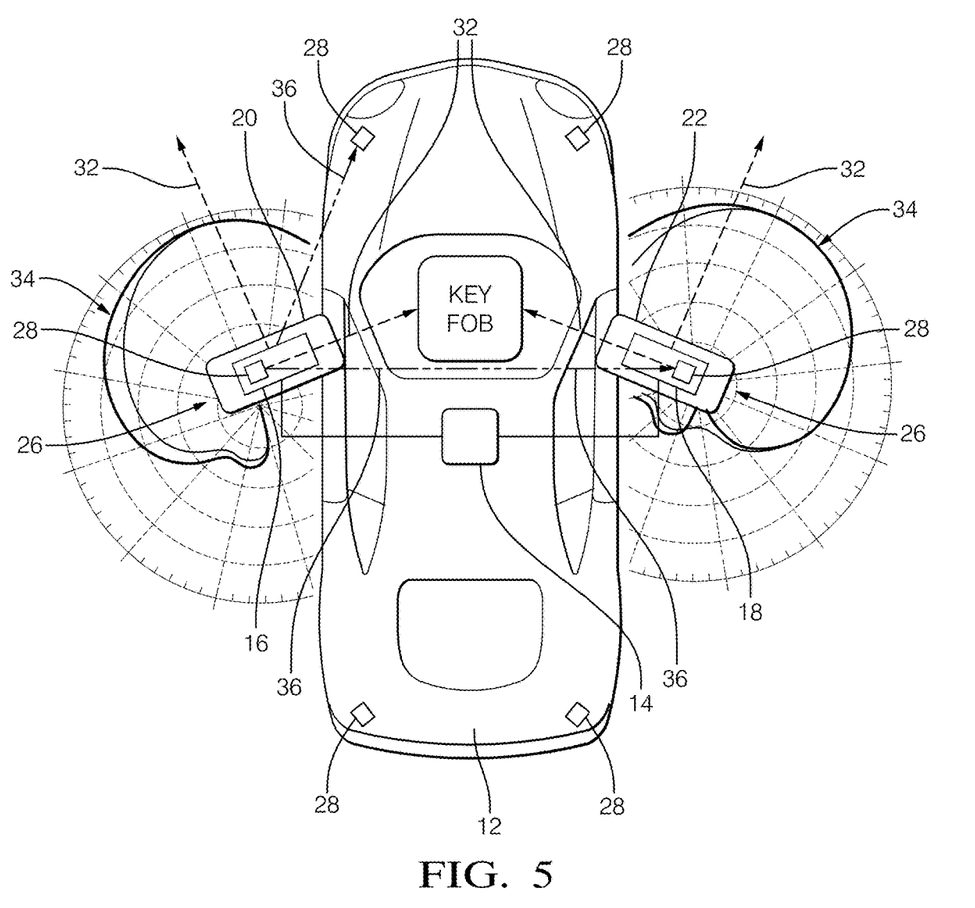
FIG. 5 illustrates another example of the example system for transmitting radio frequency signals from a device installed on the vehicle.

While the previous examples described the controller 14 transmitting the key FOB communications when the mirror housings are in the retracted position, in some examples, the controller 14 may also transmit the key FOB communications when the first housing 20 and the second housing 22 are in the second position 26 (i.e., the unretracted position), as illustrated in FIG. 5. In an example, the controller 14 places the mirror housings in the second position 26 when the vehicle 12 is parked and powered off based on the position of the key fob detected in front of the vehicle 12 to improve the localization of the key fob. In the example illustrated in FIG. 5, transmitting the key FOB communications when the mirror housings are in the un-retracted positions can enable localization of the key FOB within the vehicle cabin, which may determine whether the operator can start the engine. It will be appreciated that the elevated positions of the mirror housings, relative to the corner positions of the other communication nodes 28, may be beneficial for localizing the key FOB, or other wireless devices, within the vehicle cabin.

FIG. 5 illustrates the vehicle 12 with the first housing 20 and second housing 22 in the second position 26. In this example, the second position 26 is in the unretracted or "folded-out" position where the operator can view objects behind or beside the vehicle 12 in the left side-mirror and the right side-mirror. In some examples, the vehicle 12 automatically places the opposing side-mirror housings into the unretracted positions when the vehicle is powered on. The controller 14 is configured to transmit second RF signals 36 via the first device 16 and via the second device 18 when the first housing 20 and the second housing 22 are in the second position 26. In some examples, the second RF signals 36 comprise wireless communications that are broadcast to the other communication nodes 28 installed on the vehicle (hereafter referred to as internodal communications), including the communication node 28 in the opposing side-mirror housing. In some examples, the internodal communications may be used for self-testing or diagnostic testing of the individual communication nodes 28 distributed around the vehicle 12. In other examples, the wireless communications can convey other types of data or information between onboard components of the vehicle 12.

In the example illustrated in FIG. 5, the first device 16 and the second device 18 may respectively communicate via the internodal communications with the other communication nodes 28 located at the front-left and front-right corners of the vehicle 12. In some examples, the self-testing includes a determination that the communication nodes 28 are available and communicating with one another. In other examples, the self-testing includes confirmation testing of the distance measurements, for example, the RSSI or time of flight data confirming that the distance between the left side-mirror housing and the left-front corner communication node 28 is equal to a known design value stored in the memory of the controller 14.

An aspect of transmitting the high-frequency BLE and/or UWB RF signals when the side-mirror housings are in the unretracted position is that the antenna coverage pattern 34 is substantially blocked from expanding past the metalized surfaces of the mirrors. That is, the antenna coverage patterns 34 do not effectively cover a rear portion of the vehicle 12, thereby limiting the communications with the other communication nodes 28 located aft of the first housing 20 and the second housing 22, as illustrated in FIG. 5. To address this signal-blocking aspect of the mirrors, the controller 14 is further configured to transmit the internodal communications when the first housing 20 and the second housing 22 are in the first position 24. Referring back to the example illustrated in FIG. 3, the first device 16 emits the internodal communications when the first housing 20 is in the first position 24, thereby enabling communication between the communication node 28 located in the first device 16 and the other communication node 28 located at the left rear corner of the vehicle 12. In some examples, the controller 14 is configured to transmit the internodal communications when the first housing 20 and the second housing 22 are in the first position 24, when the vehicle 12 is powered off, and when the RKE or PEPS system is awakened by signals received from the key fob. In other examples, the controller 14 is configured to transmit the internodal communications when the first housing 20 and the second housing 22 are in the first position 24 when the vehicle 12 is powered on. While not specifically illustrated in FIG. 3, it will be appreciated that the internodal communications emitted by the first device 16 may also reach the other communication node 28 located in the front left corner of the vehicle 12.

Example Method

Figure 6:
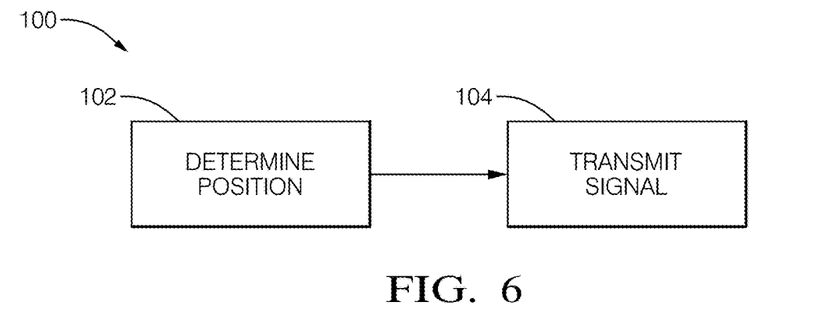
FIG. 6 illustrates an example method of transmitting radio frequency signals from a vehicle.

FIG. 6 illustrates example methods 100 performed by the system 10. For example, the controller 14 configures the system 10 to perform operations 102 through 104 by executing instructions associated with the controller 14. The operations (or steps) 102 through 104 are performed but not necessarily limited to the order or combinations in which the operations are shown herein. Further, any of one or more of the operations may be repeated, combined, or reorganized to provide other operations.

Step 102 includes DETERMINE POSITION. This can include determining, with the controller 14, whether the first housing 20 and the second housing 22 are in the first position 24 or in the second position 26, as described above. The controller 14 is in communication with the first device 16 and the second device 18 that are fixed within the first housing 20 and the second housing 22. In an example, the first housing 20 and the second housing 22 are opposing side-mirror housings attached to sides of the vehicle 12. In this example, the first position 24 is a retracted position and the second position 26 is an unretracted position, as described above. In some examples, the controller 14 determines the position of the side-mirror housings based on signals from positions sensors, as described above. In some examples, the vehicle 12 automatically places the opposing side-mirror housings into the retracted positions when the vehicle is parked and powered off. In other examples, vehicle 12 automatically places the side-mirror housings in the unretracted position when the vehicle is powered on or awakened by the key fob, as described above. The first device 16 and the second device 18 each comprise a communication node 28 configured to transmit and receive RF signals. The communication nodes 28 include one or more of a transceiver, an antenna, and a communication network channel, as described above.

Step 104 includes TRANSMIT SIGNALS. This can include transmitting, with the controller 14, first RF signals 32 via the first device 16 and via the second device 18 when the first housing 20 and the second housing 22 are in the first position 24, as described above. In some examples, transmitting the first RF signals 32 includes transmitting one of key FOB identification communications and key FOB localization communications (hereafter key FOB communications). These identification and localization communications may originate from one of the RKE system, the PEPS system, and the Digital Key system, as described above. In other examples, the controller 14 transmits the key FOB communications when the first housing 20 and the second housing 22 are in the second position, as described above.

Step 104 can also include transmitting, with the controller 14, second RF signals 36 via the first device 16 and via the second device 18 when the first housing 20 and the second housing 22 are in the second position 26, as described above. In some examples, transmitting the second RF signals 36 includes broadcasting communications via the second RF signals 36 to communication nodes 28 installed on the vehicle 12 (hereafter internodal communications), as described above. In some examples, transmitting the internodal communications includes transmitting the RF signals in accordance with one of a BLUETOOTH® Core Specification version 4.2 and later, and an Ultra-wideband (UWB) technology, as described above. In some examples, the communications may be used for self-testing or diagnostic testing of the individual communication nodes 28 distributed around the vehicle 12. In other examples, the controller 14 transmits the internodal communications when the first housing 20 and the second housing 22 are in the first position 24, as described above.

EXAMPLES

In the following section, examples are provided.

Example 1. A system, comprising a controller in communication with: a first device fixed within a first housing attached to, or that forms part of, an exterior portion of a vehicle; and a second device fixed within a second housing attached to, or that forms part of, the exterior portion of the vehicle, the controller being configured to: determine whether the first housing and the second housing are in a retracted position or in an unretracted position; and when the first housing and the second housing are in the retracted position, transmit first radio frequency (RF) signals via the first device and via the second device.

Example 2. The system of the previous example, wherein when the first housing and the second housing are in the unretracted position, the controller is further configured to transmit second RF signals via the first device and via the second device.

Example 3. The system of any of the previous examples, wherein the first housing and the second housing comprise opposing side-mirror housings.

Example 4. The system of any of the previous examples, wherein the first device and the second device each comprise a communication node, and each communication node comprises one or more of a transceiver, an antenna, and a communication network channel.

Example 5. The system of any of the previous examples, wherein the first RF signals are different than the second RF signals and the first RF signals comprise one of key FOB identification communications and key FOB localization communications.

Example 6. The system of any of the previous examples, wherein the controller is further configured to transmit first RF signals originating from one of a remote keyless entry (RKE) system, a passive entry passive start (PEPS) system, and a Digital Key system.

Example 7. The system of any of the previous examples, wherein the controller is further configured to transmit the first RF signals when the first housing and the second housing are in the second position.

Example 8. The system of any of the previous examples, wherein the second RF signals are different than the first RF signals and the second RF signals comprise wireless communications that are broadcast to communication nodes installed on the vehicle.

Example 9. The system of any of the previous examples, wherein the controller is further configured to transmit the second RF signals when the first housing and the second housing are in the retracted position.

Example 10. The system of any of the previous examples, wherein the controller is configured to transmit the first RF signals in accordance with one of a BLUETOOTH® Core Specification version 4.2 and later, and an Ultra-wideband (UWB) technology.

Example 11. A method, comprising determining, with a controller in communication with: a first device fixed within a first housing attached to, or that forms part of, an exterior portion of a vehicle; and a second device fixed within a second housing attached to, or that forms part of, the exterior portion of the vehicle, whether the first housing and the second housing are in a retracted position or in an unretracted position; transmitting, with the controller, first radio frequency (RF) signals via the first device and via the second device when the first housing and the second housing are in the retracted position.

Example 12. The method of the previous example, including transmitting, with the controller, second RF signals via the first device and via the second device when the first housing and the second housing are in the unretracted position.

Example 13. The method of the previous example, wherein the first housing and the second housing are opposing side-mirror housings.

Example 14. The method of any of the previous examples, wherein the first device and the second device each comprise a communication node, and wherein each communication node comprises one or more of a transceiver, an antenna, and a communication network channel.

Example 15. The method of any of the previous examples, wherein the first RF signals are different than the second RF signals and transmitting the first RF signals includes transmitting one of key FOB identification communications and key FOB localization communications.

Example 16. The method of any of the previous examples, including transmitting, with the controller, first RF signals originating from one of a remote keyless entry (RKE) system, a passive entry passive start (PEPS) system, and a Digital Key system.

Example 17. The method of any of the previous examples, including transmitting, with the controller, first RF signals when the first housing and the second housing are in the second position.

Example 18. The method of any of the previous examples, wherein the second RF signals are different than the first RF signals, including broadcasting wireless communications via the second RF signals to communication nodes installed on the vehicle.

Example 19. The method of any of the previous examples, including transmitting, with the controller, second RF signals when the first housing and the second housing are in the retracted position.

Example 20. The method of any of the previous examples, including transmitting, with the controller, the RF signals in accordance with one of a BLUETOOTH® Core Specification version 4.2 and later and an Ultra-wideband (UWB) technology.

Example 21. A system, comprising a controller in communication with: a first device fixed within a first side-mirror attached to, or that forms part of, an exterior portion of a vehicle; and a second device fixed within a second side-mirror attached to, or that forms part of, the exterior portion of the vehicle, the controller being configured to: determine whether the first side-mirror and the second side-mirror are in a retracted position or in an unretracted position; when the first side-mirror and the second side-mirror are in the retracted position, transmit first radio frequency (RF) signals via the first device and via the second device; and when the first side-mirror and the second side-mirror are in the unretracted position, transmit second RF signals via the first device and via the second device.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system, comprising:
a controller in communication with:
   a first device fixed within a first housing attached to, or that forms part of, an exterior portion of a vehicle; and
   a second device fixed within a second housing attached to, or that forms part of, the exterior portion of the vehicle,
the controller being configured to:
   determine whether the first housing and the second housing are in a retracted position or in an unretracted position; and
   when the first housing and the second housing are in the retracted position, transmit first radio frequency (RF) signals via the first device and via the second device.

2. The system of claim 1, wherein when the first housing and the second housing are in the unretracted position, the controller is further configured to transmit second RF signals via the first device and via the second device.

3. The system of claim 2, wherein the first housing and the second housing comprise opposing side-mirror housings.

4. The system of claim 2, wherein the first device and the second device each comprise a communication node, and each communication node comprises one or more of a transceiver, an antenna, and a communication network channel.

5. The system of claim 2, wherein the first RF signals are different than the second RF signals and the first RF signals comprise one of key FOB identification communications and key FOB localization communications.

6. The system of claim 5, wherein the controller is further configured to transmit first RF signals originating from one of a remote keyless entry (RKE) system, a passive entry passive start (PEPS) system, and a Digital Key system.

7. The system of claim 2, wherein the second RF signals are different than the first RF signals and the second RF signals comprise wireless communications that are broadcast to communication nodes installed on the vehicle.

8. The system of claim 7, wherein the controller is further configured to transmit the second RF signals when the first housing and the second housing are in the retracted position.

9. The system of claim 2, wherein the controller is configured to transmit the first RF signals in accordance with one of a BLUETOOTH® Core Specification version 4.2 and later, and an Ultra-wideband (UWB) technology.

10. A method, comprising:
determining, with a controller in communication with:
a first device fixed within a first housing attached to, or that forms part of, an exterior portion of a vehicle; and
a second device fixed within a second housing attached to, or that forms part of, the exterior portion of the vehicle,
whether the first housing and the second housing are in a retracted position or in an unretracted position; and
transmitting, with the controller, first radio frequency (RF) signals via at least one of the first device or the second device when the first housing and the second housing are in the retracted position.

11. The method of claim 10, including transmitting, with the controller, second RF signals via at least one of the first device or the second device when the first housing and the second housing are in the unretracted position.

12. The method of claim 11, wherein the first housing and the second housing are opposing side-mirror housings.

13. The method of claim 11, wherein the first device and the second device each comprise a communication node, and wherein each communication node comprises one or more of a transceiver, an antenna, and a communication network channel.

14. The method of claim 11, wherein the first RF signals are different than the second RF signals and transmitting the first RF signals includes transmitting one of key FOB identification communications and key FOB localization communications.

15. The method of claim 14, including transmitting, with the controller, first RF signals originating from one of a remote keyless entry (RKE) system, a passive entry passive start (PEPS) system, and a Digital Key system.

16. The method of claim 11, wherein the second RF signals are different than the first RF signals, including broadcasting wireless communications via the second RF signals to communication nodes installed on the vehicle.

17. The method of claim 16, including transmitting, with the controller, second RF signals when the first housing and the second housing are in the retracted position.

18. A system, comprising:
a controller in communication with:
a first device fixed within a first side-mirror attached to, or that forms part of, an exterior portion of a vehicle; and
a second device fixed within a second side-mirror attached to, or that forms part of, the exterior portion of the vehicle,
the controller being configured to:
determine whether the first side-mirror and the second side-mirror are in a retracted position or in an unretracted position;
when the first side-mirror and the second side-mirror are in the retracted position, transmit first radio frequency (RF) signals via the first device and via the second device; and
when the first side-mirror and the second side-mirror are in the unretracted position, transmit second RF signals via the first device and via the second device.

19. The system of claim 18, wherein the first RF signals are different than the second RF signals.

20. The system of claim 18, wherein the first RF signals comprise at least one of key FOB identification communications or key FOB localization communications.

* * * * *